United States Patent [19]
Takahashi

[11] 3,850,728
[45] Nov. 26, 1974

[54] STITCHING APPARATUS
[75] Inventor: Shoji Takahashi, Tokyo, Japan
[73] Assignee: Bridgestone Tire Company Limited, Tokyo, Japan
[22] Filed: Dec. 29, 1972
[21] Appl. No.: 319,466

[30] Foreign Application Priority Data
Dec. 31, 1971  Japan .................................. 47-669

[52] U.S. Cl. ................ 156/358, 156/132, 156/368, 156/402
[51] Int. Cl. ...................... B29h 17/08, B29h 17/18
[58] Field of Search .......... 156/132, 402, 350, 358, 156/367, 368, 410, 421

[56] References Cited
UNITED STATES PATENTS

| | | | |
|---|---|---|---|
| 1,469,753 | 10/1923 | Dirkson et al. | 156/402 X |
| 2,354,434 | 7/1944 | Stevens | 156/402 X |
| 2,488,340 | 11/1949 | Shook et al. | 156/367 |
| 2,555,343 | 6/1951 | Jones | 156/367 X |
| 2,681,684 | 6/1954 | Giletta et al. | 156/410 |
| 2,994,024 | 7/1961 | Vanzo et al. | 156/367 X |
| 3,524,784 | 8/1970 | Isaksson et al. | 156/367 |
| 3,616,060 | 10/1971 | Askam et al. | 156/402 |
| 3,754,124 | 8/1973 | Dressler | 156/402 |

Primary Examiner—Clifton B. Cosby
Attorney, Agent, or Firm—Waters, Roditi, Schwartz & Nissen

[57] ABSTRACT

Herein disclosed is a stitching apparatus for stitching the plies or treads to build a green tire on a revolving building drum, which comprises a pair of stitching assemblies each including a travelling carrier movable parallel to the rotational axis of the building drum, a stitcher disc arm swingably mounted at one end thereof on the carrier, a stitcher discs rotatably mounted on the other end of the arm, the major surfaces of the disc being inclined through an acute angle from a line connecting the pivot of the arm and the central point of the disc and angled from the axis of the building drum, and urging means for urging the arm toward of the building drum, and travelling means for travelling the stitching assemblies in parallel with the axis of the building drum in such a manner that the discs meet each other and respectively move in opposite direction up to the utmost end of the building drum while contacting with the utmost ply or treads on the building drum.

4 Claims, 11 Drawing Figures

STITCHING APPARATUS

The present invention relates to a stitching apparatus and, more particularly, to an improved stitching apparatus which is simple in construction and reliable in operation.

Carcass for tires are normally built by laying various plies of cord fabric and of unvulcanized rubber onto a revolving building drum. The various plies must then be "stitched," i.e., they must be compressed against the drum surface, in order to cause them to adhere to one another and to remove any air entrapped between them.

In stitching apparatus now in use, the stitching operations are performed by means of a pair of stitcher discs, which are moved symmetrically with one another from the center of length of the building drum outwardly thereof and parallelly to the axis of the building drum while the drum is rotated. Since the building drum has at each end thereof, in the axial section of the drum, a round shoulder tangential to the outer periphery of the drum and the end face thereof, around which shoulder the plies are laid during or prior to the stitching operation, the stitcher discs are mounted on mechanisms which permit the disc to traverse around the shoulder whilst the discs perform an arcuate movement about the center of curvature of the shoulder. Conventional stitching apparatus are inevitably large and complicated in construction. Furthermore, the conventional apparatus necessitate tedious and complicated manual operations in order to make available for manufacture of tires of different sizes and are substantially incapable of stitching the bead portion of the tire.

It is accordingly a principal object of the present invention to provide an improved stitching apparatus which is simple and compact in construction and accordingly economical.

It is another object of the present invention to provide an improved stitching apparatus which is capable of building green tires of high quality without tedious manual operations.

It is a further object of the present invention to provide an improved stitching apparatus which is capable of smoothly stitching the bead portion of the carcass without unwanted breakage of the chafer of the bead portion.

Other objects and advantages of the present invention will become more fully apparent from the following detailed description when taken in conjunction with the drawings in which:

Referring now to the drawings and more specifically to FIGS. 1, 2, 3, 4 and 5 thereof, it will be seen a stitching apparatus according to the present invention, which comprises a fixed base 10 on which two pairs of guide shafts 11, 11' and 12, 12' are fixedly mounted in parallel with the axis of a revolving building drum 13, one pair of guide shafts 11 and 11' being, in this case, placed at a higher position than the other pair of guide shafts 12 and 12'. A pair of stitching assemblies 14 and 14' are guided for sliding movement in parallel with the rotation axis of the building drum 13. These assemblies 14 and 14' are driven by a pair of screws 15 and 15' which are journaled on the fixed base 10 and respectively engaged with nuts of the assemblies 14 and 14'. The screw 15' is driven by a prime mover 16 such as an electric motor through sprockets 17, 18 and a chain 19. A gear 20 is fastened on one end of the screw 15' and engages with a gear 21 rotatably mounted on the base 10. The screw 15 is driven by a gear 22 mounted on one end thereof and engaging with the gear 21. The screw 15 carries thereon a sprocket 23 connected through a chain 24 with sprocket 25 which is mounted on a screw 26 of a switch assembly 27 fastened on the base 10. The switch assembly 27 contains a plurality of switch elements which are energized by actuators mounted on a carrier coupled with the screw 26 so that the actuators move forward and backward in accordance with the rotation of the screw 26 thereby to successively actuate the switch elements. The switch elements are incorporated with a suitable circuit arrangement for controlling the operation of the stitching apparatus, the circuit arrangement being described hereinafter. An elongated cam rod 28 consisting of higher and lower portions 28a and 28b parallel to each other and an intermediate slanted portion 28c is mounted on the base 10 in parallel with and in the vicinity of the guide shafts 11 and 11' so that the intermediate slanted portion 28c is placed at a position corresponding to the shoulder of the building drum 13. Another cam rod 28' identical to the cam rod 28 is fixedly mounted on the base 10 in parallel and in the vicinity of the guide shafts 12 and 12'.

Figure 1:
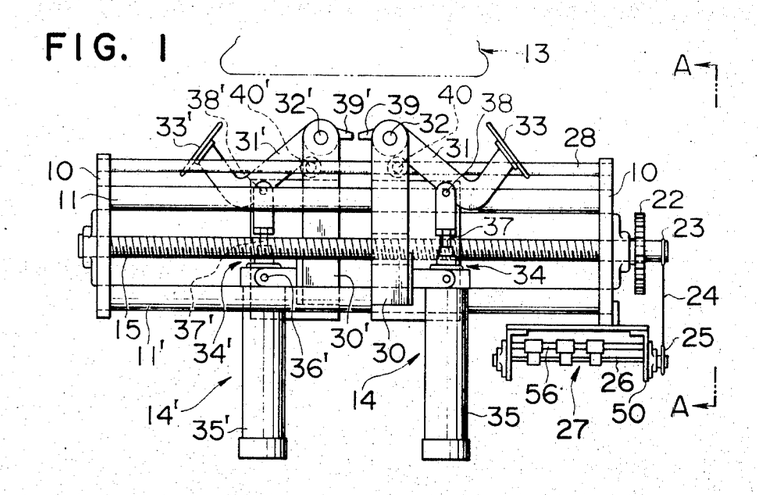
FIG. 1 is a plan view of a stitching apparatus according to the invention.
Figure 2:
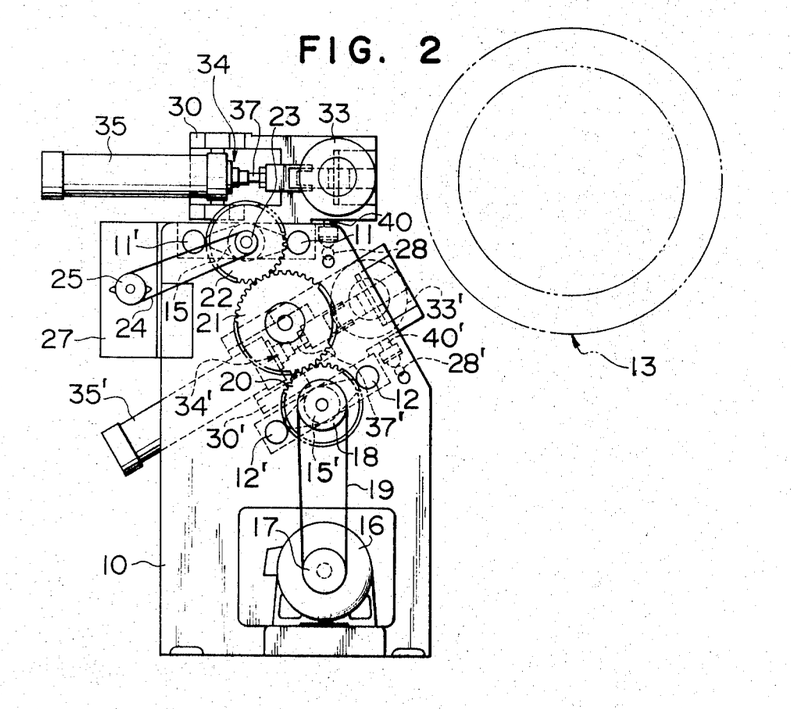
FIG. 2 is a side view of the stitching apparatus of FIG. 1 taken along line A—A.
Figure 3:
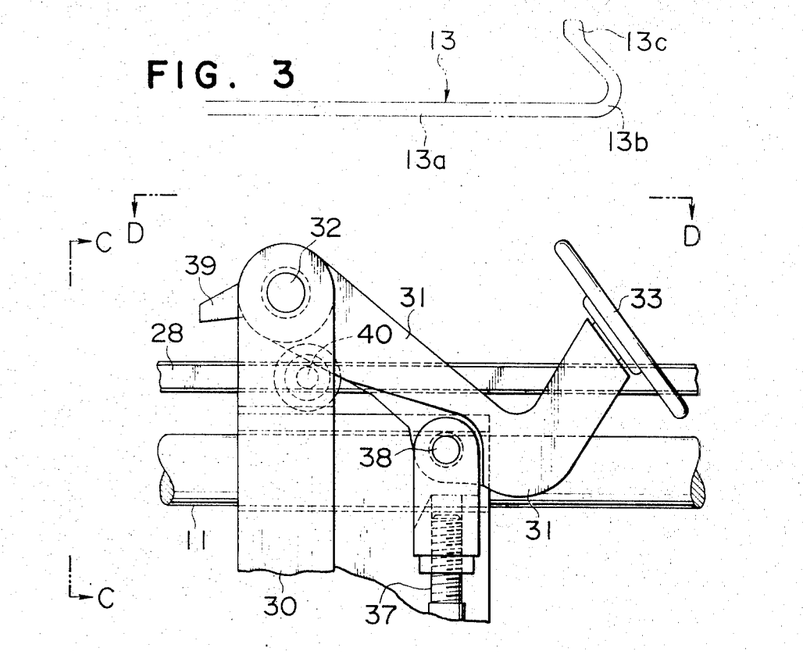
FIG. 3 is a fragmentary plan view of the stitching apparatus of FIG. 1.
Figure 4:
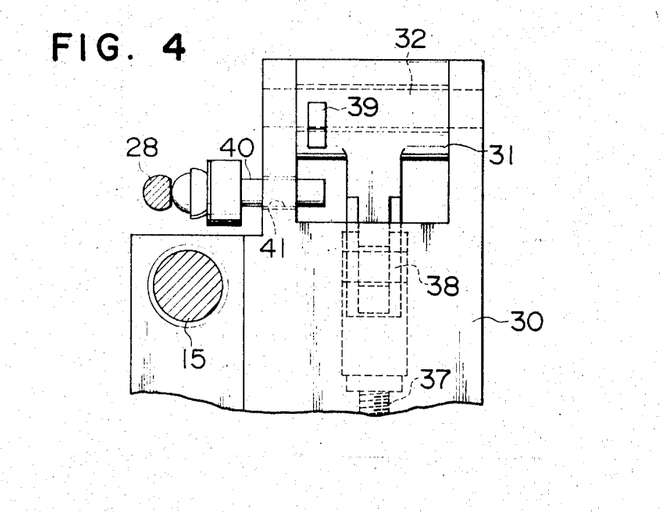
FIG. 4 is a view taken along line C—C shown in FIG. 3.
Figure 5:
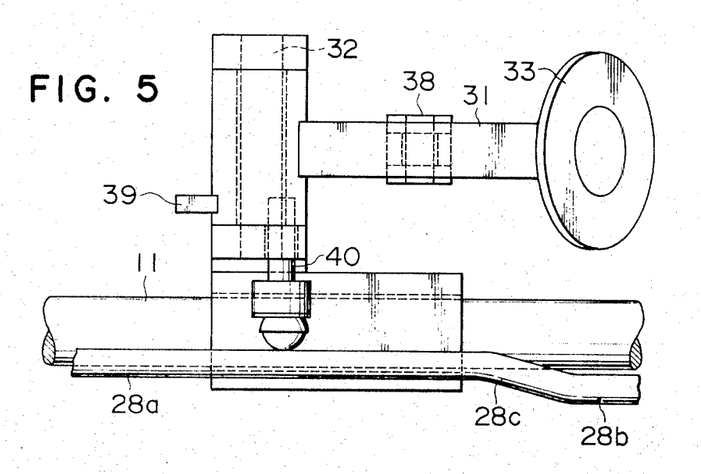
FIG. 5 is a view taken along line D—D shown in FIG. 3.

Since the two stitching assemblies 14 and 14' are identical to each other, one only will be described hereinbelow, namely, the assembly 14 which is shown in an enlarged scale in FIGS. 3, 4 and 5.

The assembly 14 includes a travelling carrier 30 slidably mounted on the guide shafts 11 and 11'. A stitcher disc arm 31 is pivotted at one end thereof on a pin 32 mounted on one end of the carrier 30, so that the arm 31 is swingable in a plane containing the rotation axis of the building drum 13. The stitcher disc arm 31 is preferably curved toward the building drum 13 in order to make compact the particular stitching assembly 14. The arm 31 carries at the other end thereof a freely rotatable stitcher disc 33 the major surfaces of which are inclined through an acute angle from a line connecting the pin 32 and the center of the disc 33. An air-cylinder assembly 34 has a cylinder 35 pivotting on a pivot 36 mounted on the carrier 30, and a piston rod 37 having one free end pivotting on a pin 38 mounted on the arm 31. When compressed air is allowed to enter the cylinder 35 by a suitable control means (not shown), the arm 31 is moved toward the building drum 13 until the stitcher disc 33 is pressed onto the utmost ply on the building drum 13 with a pressure that can be adjusted as necessary by suitable proportioning the air pressure.

A stop projection 39 is mounted on an end portion of the pivot portion of the arm 31. A following rod 40 is reciprocally movably inserted into a bore 41 formed at a lower wall of the carrier 30, so that the following rod 40 engages at one round end the cam rod 28. When, with this arrangement, the carrier 30 is outward moved from the central position thereof, the following rod 40 slides on the cam rod 28 from the portion 28d through the slanted portion 28c to the portion 28b, so that the rod 40 is moved down to a lower position allowing arm 31 to freely swing.

Since the stitcher assembly 14' has identically the same construction as the assembly 14, the corresponding parts of the assembly 14' are designated by the same reference numerals with primes.

It should be now understood that the stitching process for building a carcass ply structure is divided into three phases, as follows:

1st phase. — In this phase the discs, starting from the center line (i.e., the traverse medial plane of the building drum), move parallel to the rotational axis of the building drum until they reach the round shoulder portions of the building drum, in order to perform stitching of plies or treads on a cylindrical portion of the building drum.

2nd phase. — In this phase the discs move through the round shoulder portions until they reach bead portions of the building drum in order to perform stitching of plies or treads on the round shoulder portions.

3rd phase. — In this step the discs move through the shoulder and bead portions in order to perform stitching of chafers on the shoulder and bead portions.

The stitching operation of the stitching apparatus of the invention for performing the above-stated stitching process will be described herebelow with reference to FIGS. 6, 7, 8 and 9. Since all motions of the stitching assemblies 14 and 14' are symmetrical and simultaneous, it will be sufficient to consider the motion of the assembly 14 only.

Figure 6:
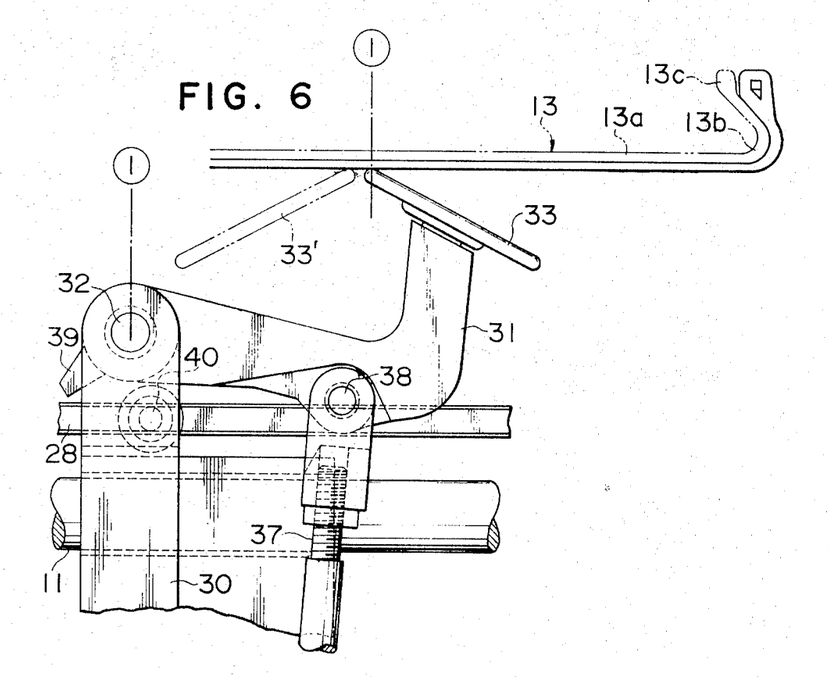
FIGS. 6, 7, 8 and 9 are explanatory views illustrating the disc of the apparatus of FIG. 1 in various positions.

1st Phase:

As shown in FIG. 6, the stitching assembly 14 is first placed at a first position (1) through rotation of the screw 15 and the arm 31 is urged against the building drum 13 by allowing compressed air to enter the cylinder 35, with the result that the disc 33 is so positioned that the periphery of the disc 33 contacts at a central position with the utmost ply or treads on the building drum 13. The screw 15 is then rotated through the above-stated linkage by the motor 16 so as to permit the periphery of the disc 33 to move from the first position (1) until the periphery of the disc 33 reaches a second position (2) whereby stitching of plies or treads, namely, uncured tire components on the portion 13a is performed.

Figure 7:
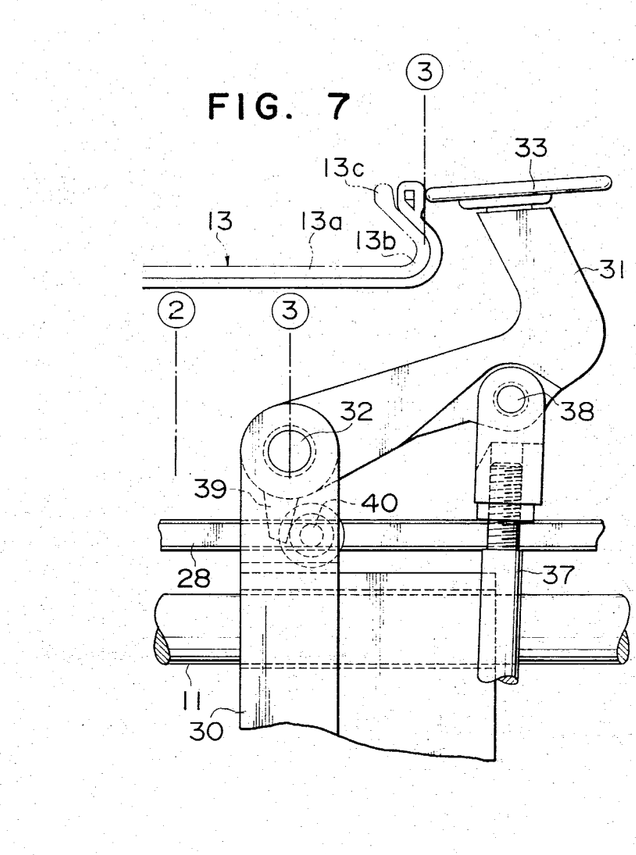

2nd Phase:

By continuously rotating the screw 15, the disc 33 continues to move from the position (2) to the position (3) as shown in FIG. 7 while contacting with the surface of the utmost ply on the building drum 13 and maintaining the inclination of the major surfaces thereof with respect to the surface of the utmost ply, because the arm 31 swings toward the building drum 13 due to the rectilinear movement of the carrier 30 and force of the piston rod 37. When the disc 33 reaches to the position (3), the compressed air is exhausted to restore the disc 33 to the home position. When it is intended to permit the stitcher disc 33 to reversely move along the building drum 13 from the third position (3) to the second position (2), the air cylinder assembly 34 is again actuated and the screw 15 is reversely rotated until the disc 33 is restored to the first position (1).

Figure 8:
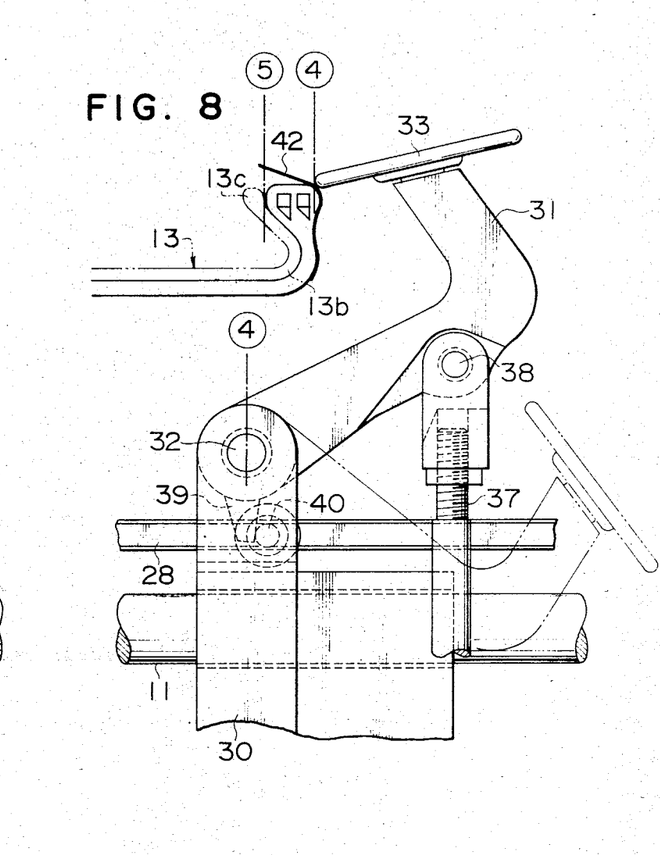
Figure 9:
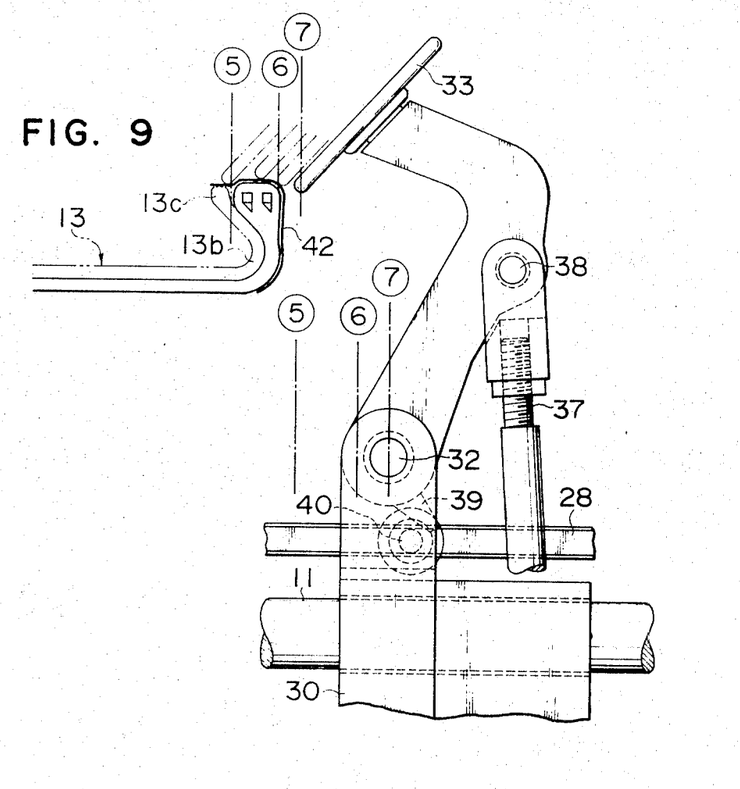

3rd Phase:

The disc 33 is first placed at the second position (2) by suitably rotating the screw 15 and allowing compressed air to enter the cylinder 35. A chafer 42 is placed on the bead portion as shown in FIG. 8. The screw 15 is then rotated so as to make the disc 33 to move from the second position (2) through the third position (3) to a fourth position (4) as shown in FIG. 8, whereby a part of the chafer 42 is adhered to the utmost ply. When the contacting periphery of the disc 33 reaches the fourth position (4), the stop projection 39 engages the following rod 40 which is now raised at a higher position by means of the cam rod 28, so that the arm 31 is prevented from swinging. At this instant, the compressed air in the cylinder 35 is exhausted so as to restore the arm 31 to the home position as shown in a phantom line in FIG. 8. Since, in this instance, the screw 15 is continuously rotated, the carrier 30 moves through fifth and sixth positions (5) and (6) to a seventh position (7) as shown in FIG. 9. Due to the movement of the carrier 30 from the fourth position (4) to the seventh position (7), the following rod 40 slides on the cam rod 28 from the higher portion 28a through the slanted intermediate portion 28c to the lower portion 28b, so that the following rod 40 lowers to the lower portion. When, therefore, the air-cylinder 34 is actuated, the arm 31 is capable of swinging to such a position as shown in FIG. 9, with the result that the periphery of the disc 33 reaches to the seventh position (7). It is now to be noted that the arm 31 is, in this instance, so sufficiently rotated that the major surfaces of the disc 33 incline through a suitable angle with respect to the surface of the end of the bead portion of the carcass ply structure. Thereupon, the screw 15 is reversely rotated thereby to move the disc 33 from the seventh position (7) through the sixth position (6) to the fifth position (5) while performing stitching of the remaining portion of the chafer 42 onto the end of the bead portion.

It is to be noted that the building drum 13 is so positioned that the periphery of the disc 33 contacting with the chafer 42 is slightly lower than the surface of the end of the bead portion whereby the periphery of the disc 33 is pressed onto the chafer 42 by a suitable pressure for the sake of a preferred stitching of the chafer 42.

It should be appreciated that the stitching aparatus of the invention prevents the arm 31 from swinging and restores the arm 31 to the home position so that the unwanted rapid movement of the disc resulting in unwanted breakage of the chafer 42 or incomplete stitching of the chafer 42 is avoided, although the chafer 42 is not so rigid. Furthermore, since the position control of the carriers of the stitching apparatus of the invention is so easy, the stitching apparatus can be readily automatically controlled. In addition, although the stitching assemblies of the stitching apparatus as above-mentioned are mounted on the two pairs of guide shafts and driven by two screw rods so as to move the stitching assemblies in different two planes thereby to permit the stitcher discs to start from the center line, it is, of course, possible to mount the stitching assemblies on a pair of guide shafts and drive the stitching assemblies by one screw rod through engaging the stitching assemblies with two treads threaded in opposite directions on one screw rod which is driven through a usual linkage by the prime mover if it is unnecessary to permit the stitcher discs to start from the center line. The air-cylinders may be mounted on suitable members which move in concurrence with the carriers.

Figure 10:
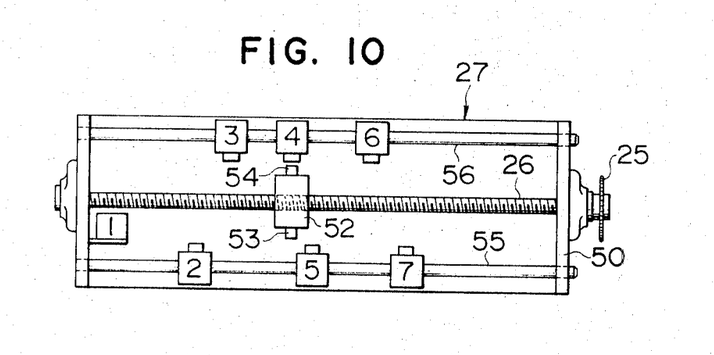
FIG. 10 is a view showing the switch assembly of the stitching apparatus of FIG. 1.

In FIG. 10, there is shown in detail the switch assembly 27 which includes a frame 50 on which the screw 26 is rotatably mounted. The screw 26 is engaged with a carrier 52 carrying thereon a pair of actuators 53 and 54. A first switch element 1 is placed at an utmost position of the frame 50, and second, third, fourth, fifth, sixth and seventh switch elements 2, 3, 4, 5, 6 and 7 are positioned along the path of the actuators 53 and 54 in the order named by means of support rods 55 and 56 fastened on the frame 50, whereby the switch elements are permitted to actuate as the carrier 52 moves forward or backward due to the rotation of the screw 26. It is now to be noted that the screw 26 has such a pitch that the carrier 52 moves similarly to the stitching assembly 14 or 14'.

Figure 11:
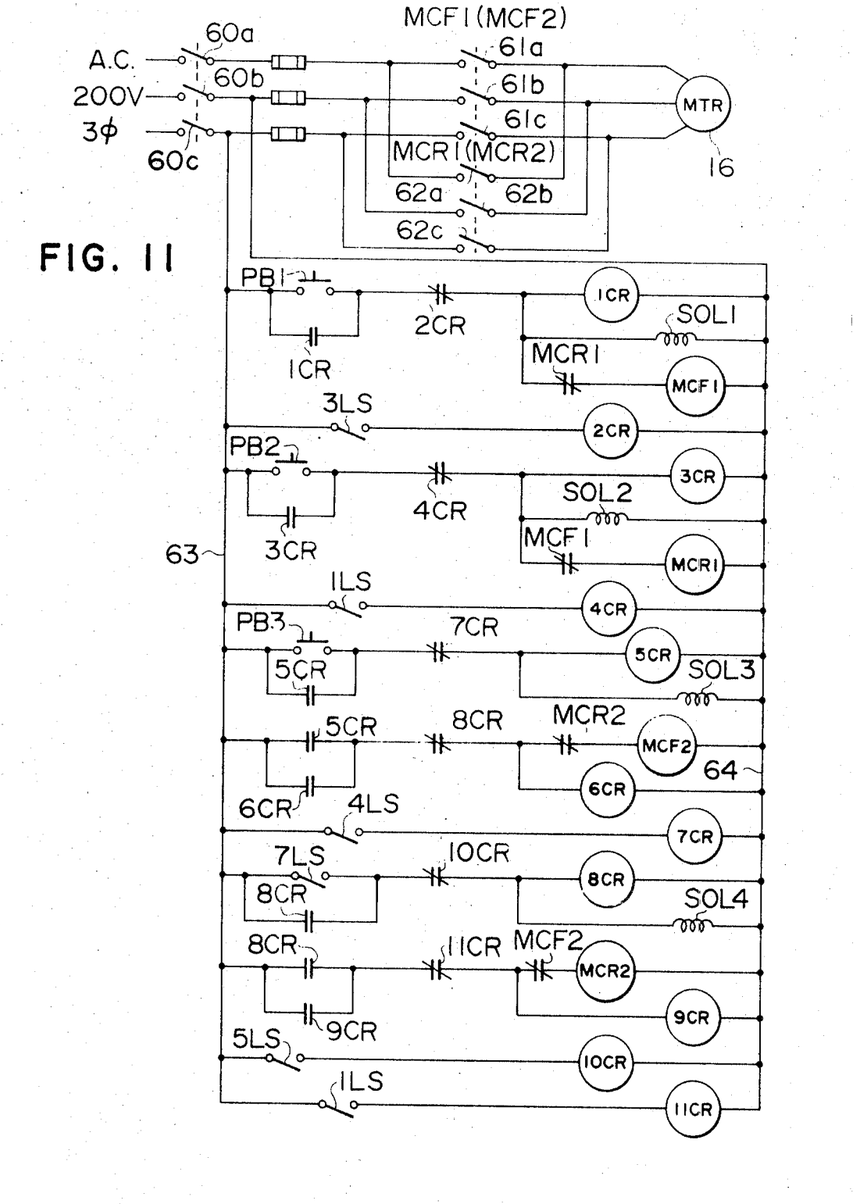
FIG. 11 is a diagram showing a circuit arrangement for controlling the stitching apparatus of FIG. 1.

In FIG. 11, there is shown a circuit arrangement connected with the switch elements of the switch assembly 27 for controlling the operation of the stitching apparatus. The circuit arrangement includes normally-open switches 60a, 60b and 60c which are connected to a 3-phase A.C. power source of, for example 200V, and in turn connected through breakers and normally-open switches 61a, 61b and 61c associated with relay coil MCF1 and MCF2 to terminals of the motor 16 of the apparatus. The switches 61a, 61b and 61c are respectively shunted by normally-open switches 62a, 62b and 62c associated with relay coils MCR1 and MCR2. A pair of bus lines 63 and 64 connected to two out of the switches 60a, 60b and 60c. A relay coil 1CR has one terminal connected to the bus line 64 and the other terminal connected through a normally-closed switch 2CR associated with a relay coil 2CR and through a start switch PB1 shunted by a normally-open switch 1CR to the bus line 63. The relay coil 1CR is shunted by a solenoid SOL 1 for opening an air inlet valve (not shown) so as to allow compressed air to enter the air cylinder 35 when the solenoid SOL 1 is energized. The 1CR is further shunted by a series connection of the relay coil MCF1 and a normally-closed switch MCR1 associated with the relay coil MCR1. A relay coil 2CR has one terminal connected to the bus line 64 and the other terminal connected to the bus line 63 through a normally-open switch 3LS associated the switch element 3 of the switch assembly 27 and adapted to actuate when the actuator 53 or 54 approaches the switch element 3. A relay coil 3CR has one terminal connected to the bus line 64 and the other terminal connected through a normally-closed switch 4CR associated with a relay coil 4CR and a push button PB2 shunted by a normally-open switch 3CR to the bus line 63. The relay coil 3CR is shunted by a solenoid SOL2 for opening the air inlet valve so as to allow compressed air to enter the air cylinder 35 when the solenoid SOL2 is energized. The relay coil 3CR is further shunted by a series connection of the relay coil MCR1 and a normally-closed switch MCF1 associated with the relay coil MCF1. A relay coil 4CR has one terminal connected to the bus line 64 and the other terminal connected to the bus line 63 through a normally-open switch 1LS associated with the switch element 1 of the switch assembly 27 and adapted to actuate when the actuator 53 or 54 approaches to the switch element 1. A relay coil 5CR has one terminal connected to the bus line 64 and the other terminal connected to the bus line 63 through a normally-closed switch 7CR associated with a relay coil 7CR and a push button PB3 shunted by a normally-open switch 5CR associated with the relay coil 5CR. The relay coil 5CR is shunted by a solenoid SOL3 for opening the air inlet valve so as to allow compressed air to enter the air-cylinder 35 when the solenoid SOL3 is energized. The relay coil MCF2 has one terminal connected to the bus line 64 and the other terminal connected from a normally-closed switch MCR2 associated with a relay coil MCR2 through a normally-closed switch 8CR associated with a relay coil 8CR and a parallel connection of normally-open switch 5CR and 6CR respectively associated with relay coils 5CR and 6CR. The relay coil MCF2 and the normally-closed switch MCR2 are shunted by the relay coil 6CR. The relay coil 7CR has one terminal connected to the bus line 64 and the other terminal connected to the bus line 63 through a normally-open switch 4LS which is actuated when the actuator aproaches the switch element 4. A relay coil 8CR has one terminal connected to the bus line 64 and the other terminal connected to the bus line 63 from a normally-closed switch 10CR through a parallel connection of a normally-open switch 8CR associated with the relay coil 8CR and a normally-open switch 7LS which is associated with the switch element 7. The relay coil MCR2 has one terminal connected to the bus line 64 and the other terminal connected to the bus line 63 from a normally-closed switch MCF2 associated with the relay coil MCF 2 through a normally-closed switch 11CR and a parallel connection of normally-open switches 8CR and 9CR respectively associated with the relay coils 8CR and 9CR. The relay coil 10CR has one terminal connected to the bus line 64 and the other terminal connected through a normally-open switch 5LS associated with the switch element 5 to the bus line 63. The relay coil 11CR has one terminal connected to the bus line 64 and the other terminal connected to the bus line 63 through a normally-open switch 1LS associated with the switch element 1.

The operation of the circuit arrangement as above-described will be explained hereinbelow in conjunction with the preceding figures. The normally-open switches 60a, 60b and 60c are previously closed. When it is intended to operate the stitching apparatus in the first and second phases, the push button PB1 is manually operated thereby to cause the relay 1CR to operate and hold by itself through the normally-open switch 1CR. At the same time, the solenoid SOL1 is energized with the result that the air-cylinder 34 urges the arm 31 toward the building drum 13. The relay MCF 1 is simultaneously energized to close the switches 61a, 61b and 61c with the result that the motor 16 commences to forwardly rotate, whereby the screw 15 rotates causing the disc 33 to move from the first position (1) toward the second position (2). When the disc 33 reaches to the third position (3), the switch element 3 is operated to close the switch 3LS, so that the relay coil 2CR is energized, whereby the relay coil 1CR, solenoid SOL1 and relay coil MCF1 are all de-energized. Accordingly, the motor 16 stops and the arm 31 is restored to the home position. When, thereupon, the push button PB1 is manually actuated, the relay coil 3CR operates and then holds by itself through the switch 3CR and 4CR. The solenoid SOL2 is simultaneously energized thereby to cause the air-cylinder 34 to urge the arm 31 until the disc 33 takes the third position (3). The relay coil MCR2 is also energized to close the switches 62a, 62b and 62c whereby the motor 16 commences to reversely rotate. Thus, the screw 15 reversely rotates thereby to cause the disc 33 to move from the third position (3) through the second positon (2) toward the first position (1). When the disc 33 reaches the first position (1), the switch element 1LS is closed thereby to cause the relay coil 4CR to be energized. When the relay coil 4CR is energized, the normally-closed switch 4CR is opened thereby to cause the relay coil 3CR, the solenoid SOL2 and the relay coil MCR1 to release, whereby the arm 31 is restored to the home position and the motor 16 is de-energized. When, thereafter, the push button PB1 is again closed, the same operation as above-described will proceed.

When it is intended to operate the stitching apparatus in the third phase, the switches 60a, 60b and 60c are previously closed and the PB3 is manually closed thereby causing the relay coil 5CR to operate and hold by itself. At this instant, the solenoid SOL3 is energized thereby to cause the air-cylinder assembly 34 to urge the arm 31 toward the building drum 13. It is, in this instance, to be understood that the screw 15 is previously rotated by a suitable control means (not shown) until the disc 33 reaches the second position (2). When the relay 5CR is energized, the switch 5CR is closed thereby to cause the relays MCF2 and 6CR to operate. When the MCF2 operates, the switches 61a, 61b and 61c are closed thereby causing the motor 16 to start. When the disc 33 reaches the fourth position (4), the switch element 4 is actuated to close the switch 4LS whereby the relay 7CR is energized. When the relay 7CR is energized, the normally-closed switch 7CR opens the circuit thereby causing the relay 5CR and the solenoid SOL3 to be deenergized, whereby the arm 31 is restored to the home position as shown in FIG. 8. When, on the other hand, the disc 33 reaches the seventh position (7), the normally-open switch 7Ls is closed thereby causing the relay 8CR and the solenoid SOL4 to be energized whereby the arm 31 is again urged until the disc 33 takes the seventh position (7) as shown in FIG. 9. Since, in this instance, the normally-closed switch 8CR is open, the relay MCR2 and the relay 6CR release so that the relay MCR2 operates and the relay 9CR also operates and then holds by itself. Therefore, the motor 16 commences to reversely rotate so as to cause the disc 33 to move from the seventh position (7) to the fifth position (5) while performing the stitching of the chafer 42 on the end of the bead portion. When the disc 33 reaches the fifth position (5), the normally-open switch 5Ls is closed to cause the relay 10CR to operate, whereby the relay 8CR and the solenoid SOL4 release. By the release of the solenoid SOL4, the arm 31 is restored to the home position. The screw 15, on the other hand, continues to reversely rotate until the carrier 30 reaches the first position (1). When the carrier 30 reaches the first position (1), the normally-open switch 1Ls is closed to cause the relay 11CR to operate whereby the relay 9CR and the relay MCR2 release with the result that the motor 16 stops.

It is now to be understood that the push button PB1, PB2 and PB3 may be replaced by switches which are controlled by suitable control means.

While there has been described a preferred embodiment of the invention it will be understood that various modifications and rearrangements may be made without departing from the scope and the spirit of the invention, as defined by the appended claims.

What is claimed is:

1. Stitching apparatus for stitching uncured tire components to build a green tire on a revolving building drum comprising, in combination, a pair of stitching assemblies each including a travelling carrier movable parallel to the axis of said building drum, a stitcher disc arm pivotally mounted at one end thereof on said travelling carrier, a stitcher disc mounted on the other end of said stitcher disc arm so that said stitcher disc is rotatable about the axis thereof, the major surfaces of said disc being inclined through an acute angle from a line connecting the pivot of said arm and the central point of said disc and angled from said axis of the building drum, urging means for urging said arm toward the surface of said building drum; travelling means including a pair of guide members mounted on a frame for guiding said carriers in parallel with said axis of the building drum, a pair of screw rods screwed with said carriers, respectively, said screw rods being rotatably mounted on said frame, driving means for forwardly and reversely rotating said screw rods so as to move said carriers in opposite directions, control means having an elongated cam rod extending parallel to said guide member with first and second portions parallel to each other and an intermediate portion connecting said first and second portions and slanted from said first and second portions, a follower rod mounted on said carrier so as to slidably abut said cam rod, and a stop projection mounted on said one end of the arm so as to be engageable with said follower rod before passing through said intermediate portion, whereby said urging means is prevented from urging said arm during a time interval from the instant when said follower rod reaches said intermediate portion passing through said first portion where said stop projection is engaged with said follower rod to the instant when said following rod reaches the second portion of said cam rod passing through said intermediate portion where said stop projection is disengaged from said following rod to urge said arm toward the surface of said building drum by said urging means.

2. Stitching apparatus as claimed in claim 1, wherein said urging means includes an air-cylinder assembly having a piston rod pivotally connected to said arm and cylinder casing pivotally connected to said carrier.

3. Stitching apparatus as claimed in claim 1, wherein said control means further includes pressurized air feeding means for feeding pressurized air to said cylinder when energized, and an electric circuit arrangement for actuating said driving means and for energizing said pressurized air feeding means.

4. Stitching apparatus as claimed in claim 3, wherein said control means further includes an actuating element moving in concurrence with the movement of said carrier through a passage, and a plurality of switch elements arranged in order along said passage, each respective one of said switch elements actuating said urging means when said actuating element approaches said respective one of said switch elements.

* * * * *